(12) United States Patent
Maas et al.

(10) Patent No.: US 7,036,803 B2
(45) Date of Patent: May 2, 2006

(54) SWITCHABLE HYDRAULIC VIBRATION DAMPING MOUNT

(75) Inventors: Clayton Maas, Holland, MI (US); Randy Phinney, Grant, MI (US); Leon Clinard, Kentwood, MI (US)

(73) Assignee: Paulstra CRC, Grand Rapids, MI (US)

( * ) Notice: Subject to any disclaimer, the term of this patent is extended or adjusted under 35 U.S.C. 154(b) by 0 days.

(21) Appl. No.: 10/840,525

(22) Filed: May 6, 2004
(Under 37 CFR 1.47)

(65) Prior Publication Data
US 2005/0248073 A1   Nov. 10, 2005

(51) Int. Cl.
*F16F 13/00*   (2006.01)

(52) U.S. Cl. ................... 267/140.12; 267/122

(58) Field of Classification Search ........... 267/140.12, 267/35, 122, 219, 140.11; 248/562, 636
See application file for complete search history.

(56) References Cited

U.S. PATENT DOCUMENTS 4,690,389 A * 9/1987 West ................... 267/140.12
5,098,072 A * 3/1992 Muramatsu et al. ... 267/140.12
6,592,110 B1   7/2003 Takashima et al.
2002/0185797 A1 * 12/2002 Someya et al. ........ 267/140.11

* cited by examiner

*Primary Examiner*—Melanie Torres
(74) *Attorney, Agent, or Firm*—Marshall, Gerstein & Borun LLP

(57) ABSTRACT

The present invention relates hydraulic mounts for mounting between two rigid elements, such as an engine and a vehicle frame, so as to damp and filter vibrations occurring essentially in a main direction, between said elements, the mount comprising:
- first and second brackets intended to be fixed respectively to the first and second rigid elements,
- a primary elastomeric member connecting the first and second brackets,
- a rate chamber having a volume filled with fluid and delimited with a secondary elastomeric member having at least a first and a second walls movable respectively with said first and second brackets when said first and second brackets moves one with regard to the other,
- at least one bellow communicating with said rate chamber, each bellow and the rate chamber being able to bulge independently of the primary elastomeric member deformation, and
- a selectively operable control valving unit for controlling the fluid motion between said rate chamber and each bellow.

5 Claims, 4 Drawing Sheets

FIG. 1.
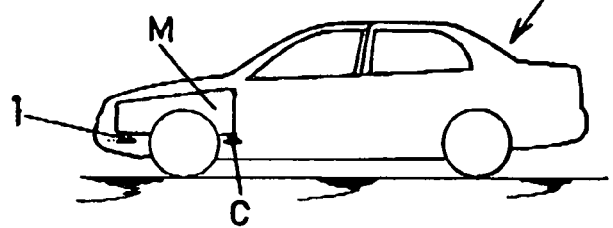
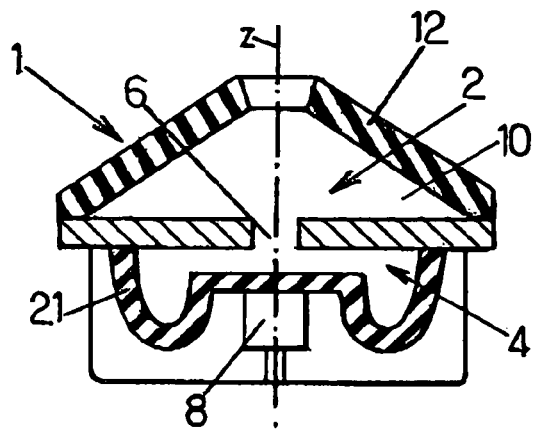
FIG. 2A.
(PRIOR ART)
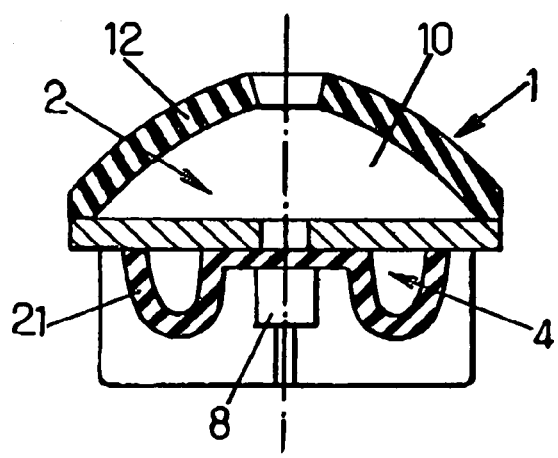
FIG. 2B.
(PRIOR ART)

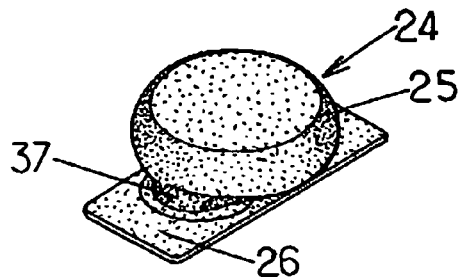
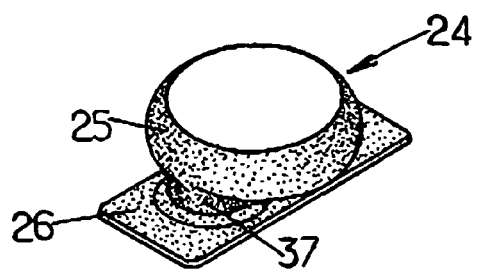
FIG.5A.  FIG.6A.
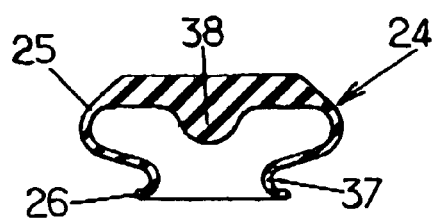
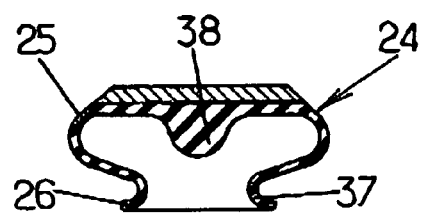
FIG.5B.  FIG.6B.
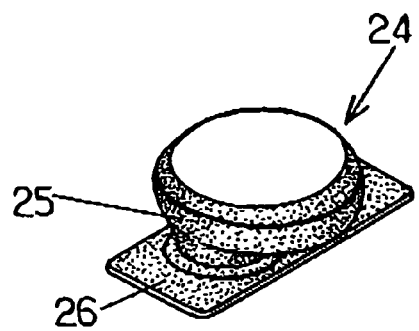
FIG.7A.
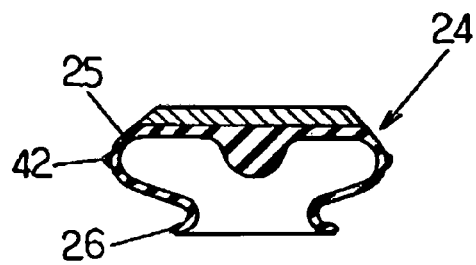
FIG.7B.

SWITCHABLE HYDRAULIC VIBRATION DAMPING MOUNT

FIELD OF THE INVENTION

The present invention relates to hydraulic vibration damping mounts. In particular, the present invention relates to hydraulic mounts for mounting between two rigid elements, such as an engine and a vehicle frame, so as to damp and filter vibrations between said elements.

As shown in FIG. 1, such an hydraulic mount 1 is mounted on a body work C of a motor vehicle V to support an engine M.

More particularly, the invention relates to an hydraulic mount comprising:

first and second brackets intended to be fixed respectively to the first and second rigid elements, and an elastomeric member connecting the first and second brackets.

BACKGROUND OF THE INVENTION

As shown in FIGS. 2A and 2B, mounts of this type are already known comprising a main fluid chamber 2 and an auxiliary fluid chamber 4 communicating by a switchable bypass passage 6. A primary elastomeric member 12 damps vibrations that occur in a main direction Z. Further, a selectively operable control valving unit 8 controls the fluid flow through the passage 6. Such an hydraulic mount is disclosed for example in U.S. Pat. No. 6,592,110.

Such mounts can have two particular states a stiff state (on the right, FIG. 2B) in which the valving unit 8 is closed and the fluid 10 is locked in the main fluid chamber 2 and causes bulging of the elastomeric member 12 and a soft state (on the left, FIG. 2A) in which the valving unit 8 is open and the fluid is free to transfer from one chamber to another and causes a secondary elastomeric member 21, softer than the first one, to bulge.

In such a mount, the problem is that the elastomeric member 12 is forced to budge when the mount switches to the stiff state. Consequently, this bulging interferes with the damping properties of the primary elastomeric member 12.

SUMMARY OF THE INVENTION

A particular object of the present invention is to mitigate this drawback.

To this end, according to the invention, it is provided an hydraulic mount for mounting between two rigid elements, such as an engine and a vehicle frame, so as to damp and filter vibrations occurring essentially in a main direction, between said elements, the mount comprising:

first and second brackets intended to be fixed respectively to the first and second rigid elements, a primary elastomeric member connecting the first and second brackets, a rate chamber having a volume filled with fluid and delimited with a secondary elastomeric member having at least a first and a second walls movable respectively with said first and second brackets when said first and second brackets moves one with regard to the other, at least one bellow communicating with said rate chamber, each bellow and the rate chamber being able to bulge independently of the primary elastomeric member deformation, and a selectively operable control valving unit for controlling the fluid motion between said rate chamber and each bellow.

By means of these dispositions, the function of the bulging can be decoupled from the function of the primary elastomeric member. Further, the stiffness can be changed by adding the bulge stiffness of a secondary elastomeric member to the stiffness of the primary elastomeric member. The stiffness from the secondary elastomeric member can be additive and significant due to the locking of fluid in the rate chamber by the valving unit. Indeed, when the valving unit is closed, the fluid is prevented from escaping the rate chamber. The rate chamber has a nearly constant volume. This forces the rate chamber to bulge. The stiffness then increases in the main direction. When the valving unit is open and the rate chamber interacts with the first bracket, the fluid is pushed out of the rate chamber, through the valving unit. Then the rate chamber collapses onto itself due to the vacuum created by the absence of fluid, the rate chamber is no longer in contact with the first bracket, thus adding no additional stiffness to the system.

In preferred embodiments of the invention, recourse may optionally also be had to one or more of the following dispositions:

said control valving unit is a one-way valve;

the mount comprises control means to reverse the one-way valve between two opposite directions;

the first wall of the rate chamber comprises a rigid insert which is able to cooperate with the first bracket;

the rate chamber comprises a non-extensible strap forming a loop extending in a plane perpendicular to the main direction;

the rate chamber has essentially a mushroom shape with a top and a foot, the first wall-being on the top and the rate chamber being connected to the valving unit by the foot.

BRIEF DESCRIPTION OF THE DRAWINGS

Other aspects, objects and advantages of the invention appear on reading the description of an embodiment thereof.

The invention will also be better understood with the help of the drawings, in which:.

FIG. 1 is a diagrammatic view of a vehicle comprising mounts of the invention;

FIG. 2A and FIG. 2B are diagrammatic axial sections of a prior art mount, respectively when the valve is open and when the valve is closed;

FIGS. 5A and 5B are respectively a perspective view of a first exemplary variant of a rate chamber for the mount shown in FIGS. 3 and 4, and a cross section of the same;

FIGS. 6A and 6B are respectively a perspective view of a second exemplary variant of a rate chamber for the mount shown in FIGS. 3 and 4, and a cross section of the same;

FIGS. 7A and 7B are respectively a perspective view of a third exemplary variant of a rate chamber for the mount shown in FIGS. 3 and 4, and a cross section of the same;

MORE DETAILED DESCRIPTION

The same reference numbers are used to designate same or similar elements in the different drawings.

Throughout the description below, terms such as "top, bottom, lower, upper, horizontal, vertical" are used only to make the description clear, with reference to the position in which the device proposed by the invention is normally used, although these terms are not restrictive.

Figure 3:
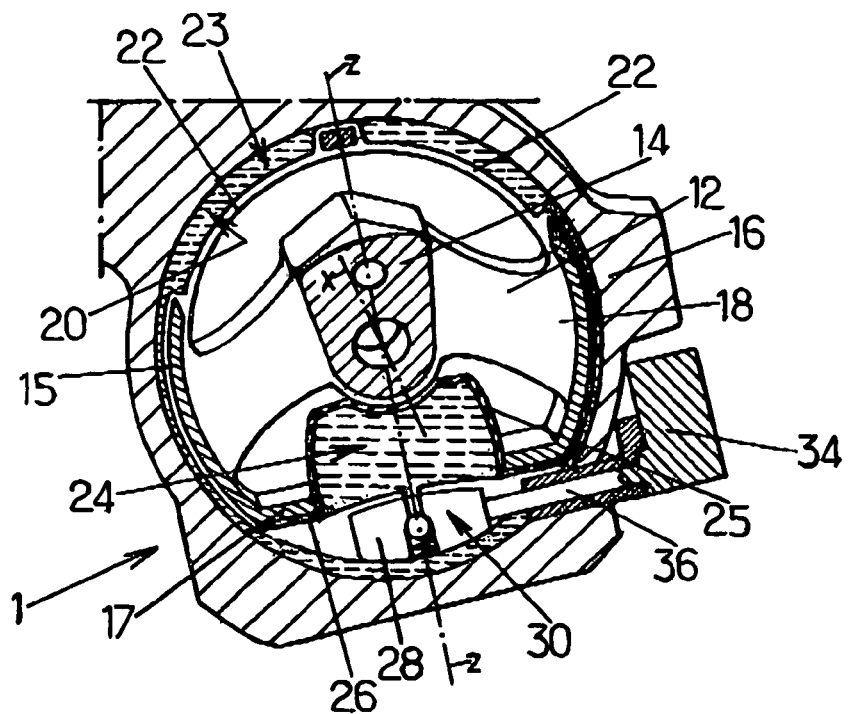
FIG. 3 is a diagrammatic cross section of a perspective view of an exemplary mount according to the present invention, when the valve is closed.

An exemplary embodiment of the mount according to the invention, is illustrated in FIG. 3. This mount 1 is a sleeve. It comprises a first 14 and second 16 brackets, which are designed to be fixed respectively to the engine and to the frame of a vehicle.

In the example illustrated here, the first bracket 14 is an inner metallic cylinder surrounded by an outer metallic cylinder constituting the second bracket 16. Both of these cylinders extend longitudinally along a central horizontal axis X. This axis X is perpendicular to a vertical axis Z, also called main direction Z.

The first 14 and second 16 brackets are interconnected by a primary elastomeric member 12. More precisely, the primary elastomeric member 12 has an inversed V-shape. The V arms 18 are joined onto the first bracket 14. The other extremities of the arms 18 join a cage 15. The primary elastomeric member 12 is overmoulded and bounded onto the first 14 bracket and the cage 15.

The cage 15 is rigid, generally made of metal, and perforated. It is suitable for providing a tight fit between the primary elastomeric member 12 and the second bracket 16. The clamping between the periphery of the primary elastomeric member 12 and the second bracket 16 can be obtained in particular by inserting the primary elastomeric member 12 in force into the second bracket 16. The cage 15 has a base 17 extending perpendicularly to the axis Z.

The cage 15 comprises at least three openings 20. Two of these openings 20 are closed by a part of the primary elastomeric member 12 forming a membrane 22. Between each membrane 22 and the inner face of the second bracket 16 remains a space which can be filled with a fluid. When the fluid pressure increases in the space, the membrane 22 bulges. Consequently, the membrane 22 forms a bellow 23.

The third opening is not closed by the primary elastomeric member 12. The third opening is cutted through the base 17. A rate chamber 24 passes through the third opening.

Figure 4:
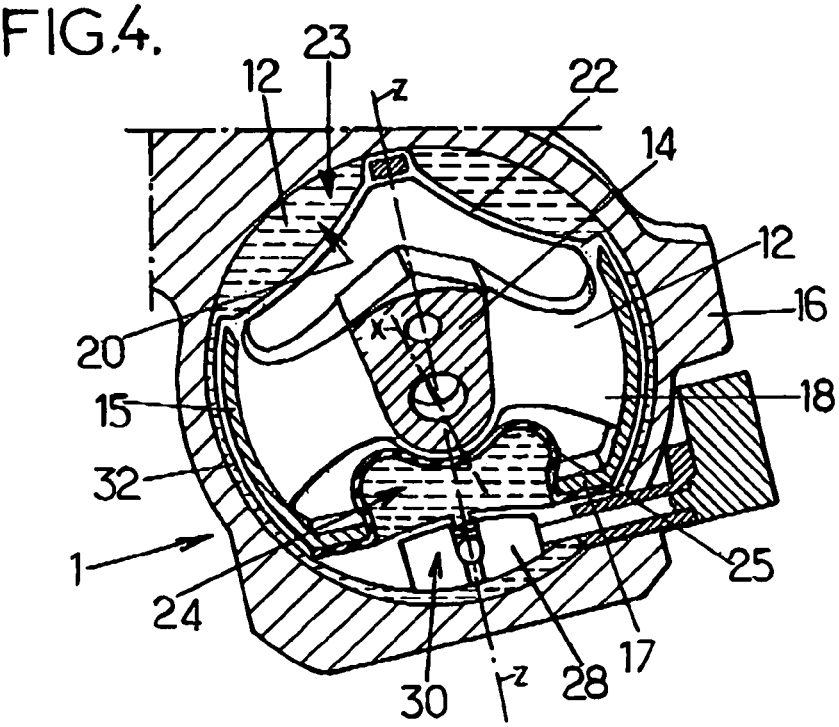
FIG. 4 is a diagrammatic cross section analogous to that of FIG. 2, the valve being open.

This rate chamber 24 can have a bell shape (see FIGS. 3 and 4) or a mushroom shape (see FIGS. 5A-7B).

As shown in FIGS. 3, 4, 5A, 5B, 6A, 6B, 7A, 7B, the rate chamber 24 comprises a bulging part 25 and a foot 26, both of them constituted by a secondary elastomeric member.

Referring again to FIG. 3, the bulging part 25 extends from the base 17 towards the first bracket 14. More precisely, the foot 26 is clamped between the base 17 and a spool 28. The spool 28 is placed between the inner surface of the second bracket 16 and the base 17.

The spool 28 comprises a valving unit 30. This valving unit 30 can be a one-way valve. Consequently, when a fluid fills the rate chamber 24, it can flow through the valving unit 30 into a duct 32 communicating with the bellows 23 (see FIG. 4).

The opening of the valving unit 30 is controlled by a motor 34 via a shaft 36. The motor 34 turns the shaft 36 and the spool 28 on 180°, in order to change the direction of the one-way valve. The one-way valve is for example a ball-spring device.

FIGS. 5A and 5B show a first variant of the rate chamber 24 of the embodiment above-described. According to this variant, instead of a bell shape, the rate chamber 24 has a mushroom shape. The bulging part 25 and the foot 26 are joined through a constriction 37. Further, the top of the rate chamber 24 comprises a protrusion 38 extending from the top of the rate chamber 24 into the bulging part 25, towards the foot 26.

According to another variant shown on FIGS. 6A and 6B, a metallic insert 40 is placed on the top of the rate chamber 24, the secondary elastomeric member constituting the rate chamber 24 is overmoulded and bounded onto the insert 40. This insert 40 allows for more uniform displacement of the fluid. This increases the mount stability.

According to another variant shown on FIGS. 7A and 7B, an unextendable strap 42 surrounds the bulging part 25. Such a strap 42 allows to change rate, as well as decrease strain.

The above described mount operates as follows.

When the valving unit 30 is open, the fluid can flow out of the rate chamber 24, but not into the rate chamber 24. This eliminates the bulge-strain effect, due to the fact that the rate chamber 24 is unable to build up pressure. The state of the rate chamber would then be described as compliant, with minimal stiffness adding to the stiffness of the primary elastomeric member 12.

Since fluid can transfer out of the rate chamber 24, but not into the rate chamber 24, if the first bracket 14, transmitting the engine movements, interacts with the rate chamber 24, it pushes the fluid out the rate chamber 24. In this condition, the rate chamber 24 collapses onto itself due to the vacuum created by the absence of the fluid.

Consequently, the rate chamber 24 is no longer in contact with the first bracket 14 and there is no additional stiffness added to the stiffness of the primary elastomeric member 12.

In fact, when the valving unit 30 is open, there is a compliant mode, when the first bracket 14 comes in contact with the top of the rate chamber 24, and a soft mode, when the first bracket 14 does no longer contact the top of the rate chamber 24.

When the valving unit 30 is closed, as long as it remains a pressure differential between bellows 23 and the rate chamber 24, the fluid flows into the rate chamber 24 but it cannot escape back through the valving unit 30 at this time. The fluid is locked in the rate chamber 24. When the equilibrium pressure is reached in the rate chamber 24 with the bellows 23, the remaining fluid in the rate chamber 24 forces the rate chamber 24 to bulge once a vertical load is applied. In this condition, the bulge stiffness of the secondary elastomeric member constituting the rate chamber 24 adds to the stiffness of the primary elastomeric member 12.

Figure 8:
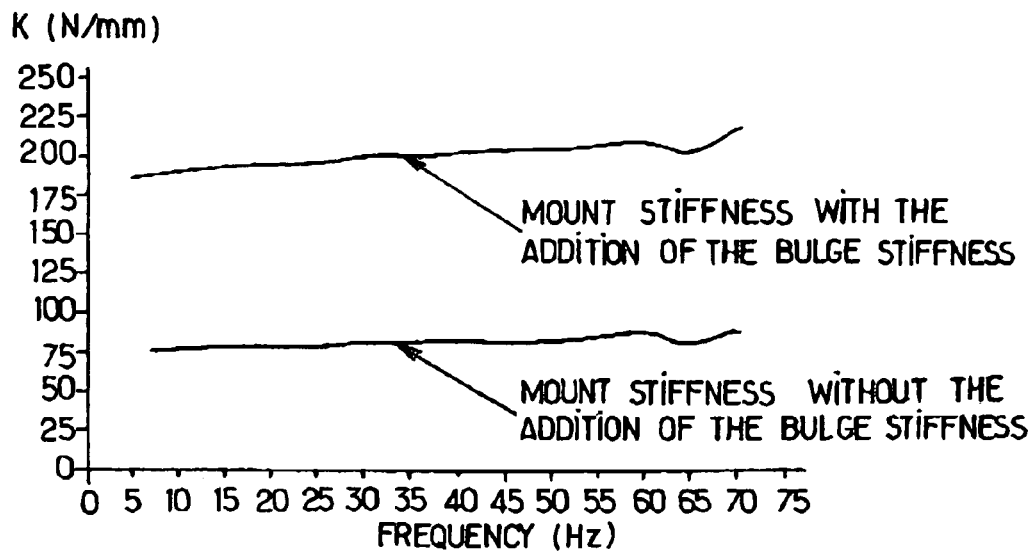
FIG. 8 is a graph showing the stiffness versus frequencies a) when the valve is open and b) when the valve is closed.

FIG. 8 shows the stiffness change when the rate chamber 24 is bulging (upper curve) versus when it is compliant (lower curve). We can see that the bulging can result in a 2:1 stiffness change.

Figure 9:
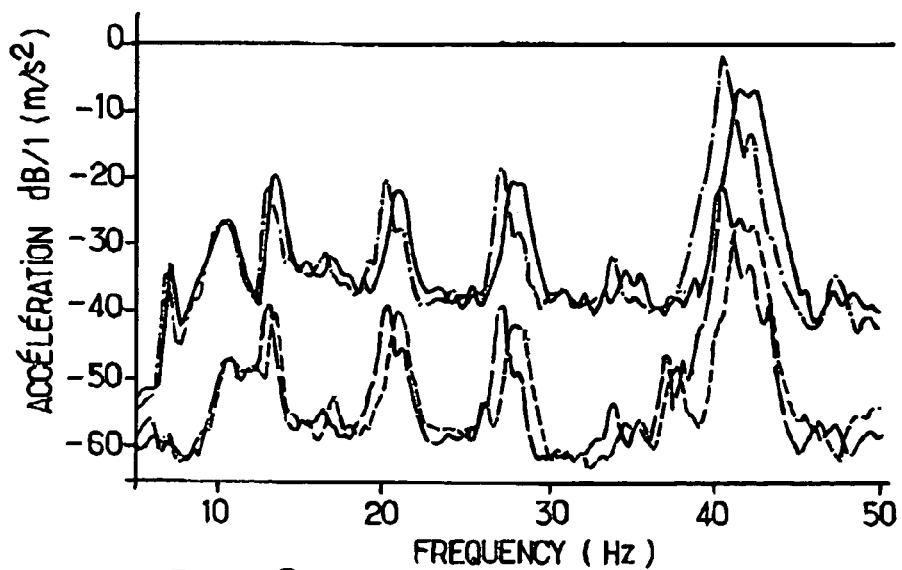
FIG. 9 is a graph showing acceleration versus frequencies respectively of the first and second brackets, when the valve is open and when the valve is closed.

FIG. 9 shows that the stiffness change affects vibration transmissibility in the vehicle. Upper curves correspond to the engine side, i.e. the first bracket 14 side. The lower curves correspond to the body side, i.e. the second bracket 16 side. The body side, i.e. the second bracket 16 side, of the V6 mode (stiff mode of the mount) and V3 mode (soft mode of the mount) shows a distinct improvement in acceleration. At the peaks, we see that the stiff mode of the mount (with bulging) has more acceleration than the soft mode (without bulging).

If:

$K_1$ is the primary elastomeric member static rate,
$K_2$ is the primary elastomeric member dynamic rate,
$K_3$ is the rate chamber static compliant rate, K4 is the rate chamber dynamic-compliant rate,
K5 is the rate chamber static bulge rate, and
K6 is the rate chamber dynamic bulge rate
we have
for the stiffest mode, a rate mount which is equal to K1+K3+K5 for static conditions and K2+K4+K6 for dynamic conditions, and
for the softest mode, a rate mount which is equal to K1+K3 for static conditions and K2+K4 for dynamic conditions.

Furthermore, in-vehicle testing has shown that a 4 dB improvement can be obtained on the steering column at idle, in the soft mode.

The mount according to the invention can be applied to the vibration damping of internal combustion engines and diesel engines in the automotive, marine, military, mining, or aerospace industries. In addition, hybrid propulsion devices that used electric motors, gas engines, diesel engines, or alternators that have measurable vibration as by-products of their operation can integrate a mount according to the invention. This mount can be used to minimize or improve vibration issues for any of these applications.

As is evident, and as is clear from the foregoing, the invention is in no way limited to those of its modes of application and embodiments which have been especially considered, it embraces, on the contrary, all variants thereof, particularly those in which the mount is of the kind above described regarding the prior art.

What is claimed is:

1. An hydraulic mount for mounting between two rigid elements, such as an engine and a vehicle frame, so as to damp and filter vibrations occurring essentially in a main direction, between said elements, the mount comprising:
   first and second brackets intended to be fixed respectively to the first and second rigid elements,
   a primary elastomeric member connecting the first and second brackets,
   a rate chamber having a volume filled with fluid and delimited with a secondary elastomeric member having at least a first and a second walls movable respectively with said first and second brackets when said first and second brackets moves one with regard to the other,
   at least one bellow communicating with said rate chamber, each bellow and the rate chamber being able to bulge independently of the primary elastomeric member deformation, and
   a selectively operable control valving unit for controlling the fluid motion between said rate chamber and each bellow, wherein said control valving unit is a one-way valve.

2. An hydraulic mount according to claim 1, comprising control means to reverse the one-way valve between two opposite directions.

3. An hydraulic mount for mounting between two rigid elements, such as an engine and a vehicle frame, so as to damp and filter vibrations occurring essentially in a main direction, between said elements, the mount comprising:
   first and second brackets intended to be fixed respectively to the firs and second rigid elements,
   a primary elastomeric member connecting the first and second brackets,
   a rate chamber having a volume filled with fluid and delimited with a secondary elastomeric member having at least a first and a second walls movable respectively with said first and second brackets when said first and second brackets moves one with regard to the other,
   at least one bellow communicating with said rate chamber, each bellow and the rate chamber being able to bulge independently of the primary elastomeric member deformation.
   a selectively operable control valving unit for controlling the fluid motion between said rate chamber and each bellow, and
   wherein the first wall of the rate chamber comprises a rigid insert which is able to cooperate with the first bracket.

4. An hydraulic mount for mounting between two rigid elements, such as an engine and a vehicle frame, so as to damp and filter vibrations occurring essentially in a main direction, between said elements, the mount comprising:
   first and second brackets intended to be fixed respectively to the first and second rigid elements.
   a primary elastomeric member connecting the first and second brackets,
   a rate chamber having a volume filled with fluid and delimited with a secondary elastomeric member having at least a first and a second walls movable respectively with said first and second brackets when said first and second brackets moves one with regard to the other,
   at least one bellow communicating with said rate chamber, each bellow and the rate chamber being able to bulge independently of the primary elastomeric member deformation,
   a selectively operable control valving unit for controlling the fluid motion between said rate chamber and each bellow, and
   wherein the rate chamber comprises a non-extensible strap forming a loop extending in a plane perpendicular to the main direction.

5. An hydraulic mount for mounting between two rigid elements, such as an engine and a vehicle frame, so as to damp and filter vibrations occurring essentially in a main direction, between said elements, the mount comprising:
   first and second brackets intended to be fixed respectively to the first and second rigid elements,
   a primary elastomeric member connecting the first and second brackets,
   a rate chamber having a volume filled with fluid and delimited with a secondary elastomeric member having at least a first and a second walls movable respectively with said first and second brackets when said first and second brackets moves one with regard to the other,
   at least one bellow communicating with said rate chamber, each bellow and the rate chamber being able to bulge independently of the primary elastomeric member deformation, and
   a selectively operable control valving unit for controlling the fluid motion between said rate chamber and each bellow, and
   wherein the rate chamber has essentially a mushroom shape with a top and a foot, the first wall being on the top and the rate chamber being connected to the valving unit by the foot.

* * * * *

UNITED STATES PATENT AND TRADEMARK OFFICE
CERTIFICATE OF CORRECTION

| | | |
|---|---|---|
| PATENT NO. | : 7,036,803 B2 | Page 1 of 1 |
| APPLICATION NO. | : 10/840525 | |
| DATED | : May 2, 2006 | |
| INVENTOR(S) | : Clayton Mass et al. | |

It is certified that error appears in the above-identified patent and that said Letters Patent is hereby corrected as shown below:

In the Claims:
In Claim 3, at Column 5, line 59, please delete "firs" and insert -- first --

Signed and Sealed this

Fifteenth Day of May, 2007

JON W. DUDAS
*Director of the United States Patent and Trademark Office*